Nov. 14, 1950     J. KONOPKA ET AL     2,529,806
VEHICLE SUSPENSION
Filed May 22, 1947     2 Sheets-Sheet 1
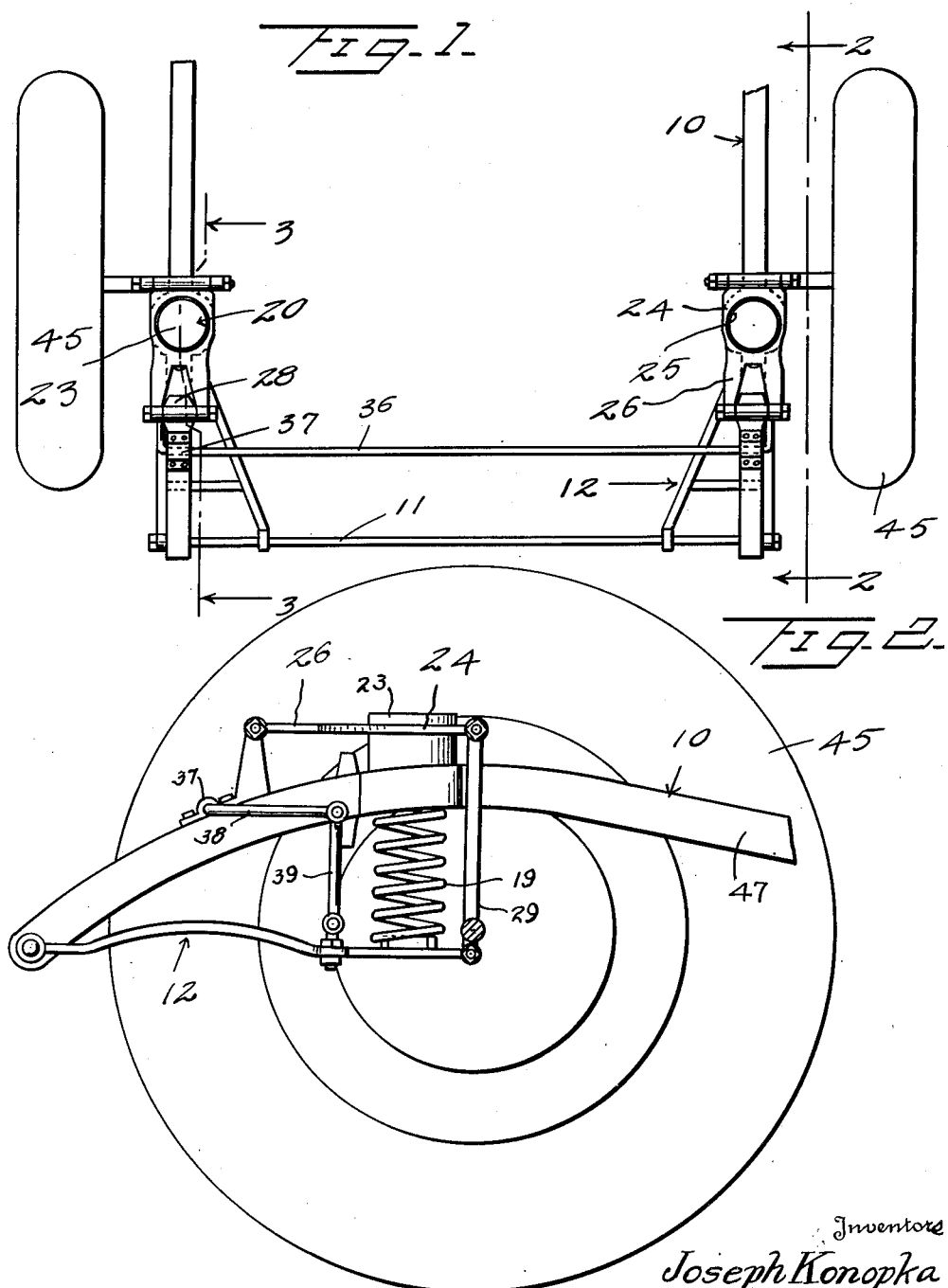
Inventors
Joseph Konopka
Edward J. Konopka
By Kimmel & Crowell
Attorneys Nov. 14, 1950  J. KONOPKA ET AL  2,529,806
VEHICLE SUSPENSION
Filed May 22, 1947  2 Sheets-Sheet 2
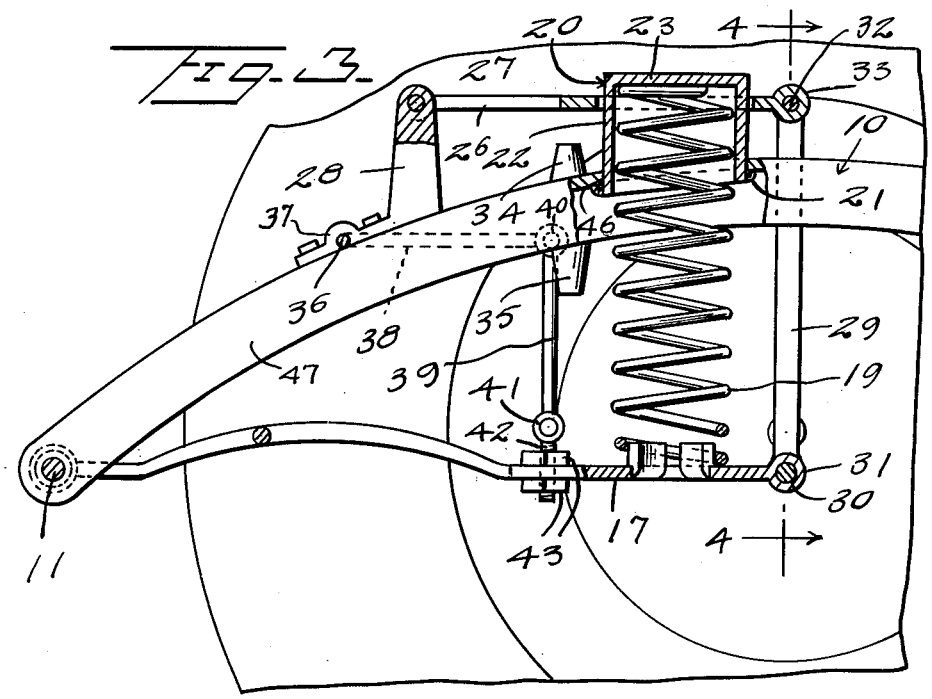
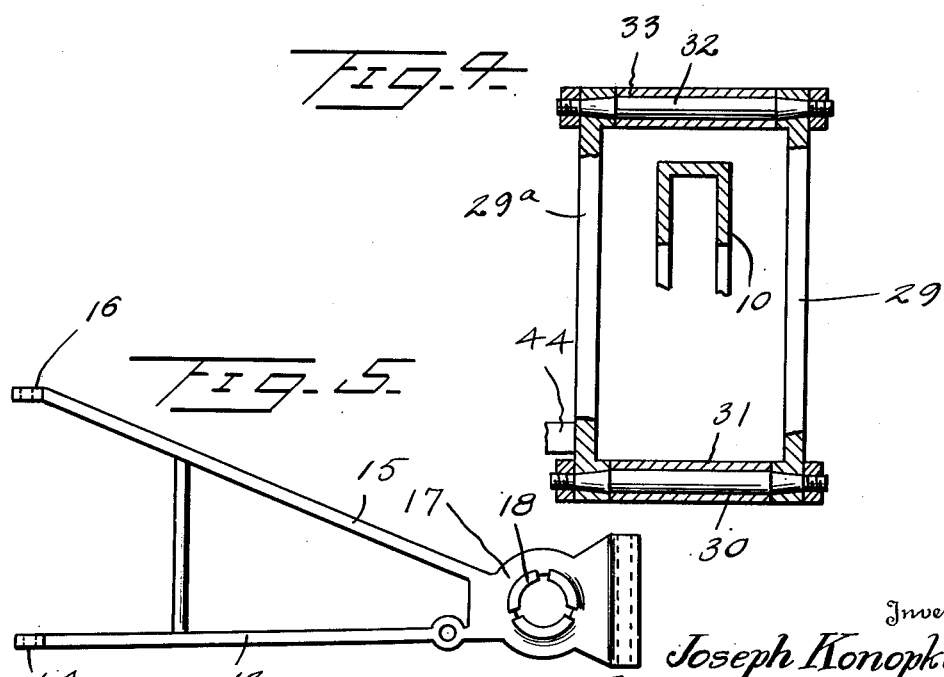
Inventors
Joseph Konopka
Edward J. Konopka
By
Attorneys Patented Nov. 14, 1950

2,529,806

UNITED STATES PATENT OFFICE 2,529,806

VEHICLE SUSPENSION

Joseph Konopka and Edward J. Konopka, Detroit, Mich.

Application May 22, 1947, Serial No. 749,644

1 Claim. (Cl. 267—20)

This invention relates to vehicle suspension means.

An object of this invention is to provide a vehicle suspension means whereby each wheel may vertically move independent of the other wheel.

Another object of this invention is to provide an improved suspension for a vehicle wheel which includes an inverted socket within which one end of a spring engages, and a rockable lever construction with which the other end of the spring engages, the lever construction including a spindle or axle on which a wheel is mounted.

Another object of this invention is to provide a vehicle suspension of this kind which also includes a torsion rod adapted to cooperate with the springs for each wheel in resiliently resisting vertical movement of one wheel and stabilizing the movement by transfer of at least some of the force to the opposite wheel and associated suspension means.

With the above and other objects in view, our invention consists in the arrangement, combination and details of construction disclosed in the drawings and specification, and then more particularly pointed out in the appended claim.

In the drawings,

Figure 1 is a detail plan view of a vehicle suspension constructed according to an embodiment of this invention, Figure 2 is a sectional view taken on the line 2—2 of Figure 1, Figure 3 is a fragmentary sectional view taken on the line 3—3 of Figure 1, Figure 4 is a fragmentary sectional view taken on the line 4—4 of Figure 3, Figure 5 is a plan view of one of the suspension levers.

Referring to the drawings, the numeral 10 designates generally the frame or chassis of a vehicle. The frame 10 has extending between the forward ends thereof a shaft or bar 11. A pair of suspension levers generally designated as 12 are rockably mounted on the shaft or bar 11, there being one lever for each front wheel of the vehicle.

The lever 12 comprises an elongated bar 13 formed with a bearing eye 14 at its forward end, and a second elongated bar 15 is disposed in forwardly divergent relation with respect to the bar 13 and is provided at its forward end with a bearing eye 16. The rear ends of the bars 13 and 15 are fixed to or formed integral with a plate 17, and preferably as shown in Figure 3, the bars or levers 13 and 15 are upwardly arched between the ends thereof.

The plate 17 has extending from the center thereof circumferentially spaced upstanding flanges 18 about which the lower end of a spring 19 is adapted to engage. The spring 19 at its upper end engages within a socket or cap 20 which is fixed, as by welding or other suitable means 21, to the frame 10, about an opening 46 near one end of the longitudinal frame members 47.

The socket or keeper 20 includes a cylindrical side wall 22 and a top wall 23. An upper plate 24 is formed with an opening 25 within which the keeper or socket 20 is adapted to loosely engage. The plate 24 has extending forwardly therefrom a pair of arms or levers 26 which are rockably mounted on a pivot member 27 extending through an upright supporting standard 28 fixed to the upper side of the frame 10, as shown in Figure 3.

The plate 17 is linked to the plate 24 by means of a pair of connecting links 29 which at the lower ends are mounted on a pin 30 extending through a barrel 31 formed at the rear end of the plate 17. The upper ends of the links 29 are rockably mounted on a pin 32 extending through a barrel 33 formed at the rear end of the upper plate 24.

A cushion block 34 is mounted on the upper side of the frame 10 in a position to be engaged by downward rocking of the plate 24, and a second or lower cushion block 35 is secured to the lower side of the frame 10 for engagement with the plate 17 upon extreme upward rocking thereof. The two suspension lever members 12 are adapted to be connected together so that one suspension lever will act to resist rocking of the other lever through the medium of an elongated torsion rod 36 which is journaled through a pair of bearings 37 fixed to the upper side of the frame 10. The opposite ends of the torsion rod 36 are bent right angularly as indicated at 38, to form a bellcrank, and the right angle crank member 38 is extended rearwardly and is connected to an associated lever 12 by means of a connecting link 39.

The link 39 at its upper end engages a pivot member 40 which extends through the crank arm 38. The lower end of the link 39 engages a pivot member 41 which extends through an eye bolt 42 fixed by nuts 43 to the plate 17. The outermost one of the links 29a has extending outwardly therefrom a spindle 44 on which a wheel 45 is adapted to be rotatably mounted.

In the use and operation of this suspension means, upward rocking of the suspension levers 12 will be resisted by tension of the spring 19, In addition to the resistance afforded by the spring 19, the upward rocking of one suspension lever relative to the other suspension lever will be resisted by the torsion rod 36 through the medium of the crank arm 38. In other words, when one suspension lever rocks upwardly the associated crank arm 38 will be rocked upwardly and the torsion rod 36 will be twisted or put under a torsional strain which will be resisted by the crank arm at the opposite end of the torsion rod.

We do not mean to confine ourselves to the exact details of construction herein disclosed, but claim all variations falling within the purview of the appended claim.

What we claim is:

A wheel suspension means for the frame or chassis of a vehicle comprising a transversely disposed horizontal bar fixed between the longitudinal side members of said frame, said side members formed with openings along the length thereof, a rock lever carried by said bar adjacent each of the side members and extending along the length of said frame, each said lever being formed of a rear plate, a pair of divergent arms integral with said plate and pivotally engaging said bar, a downwardly opening socket for each lever fixed to said frame above said opening, an upstanding annular flange carried by said plate, a downwardly extending spring between each socket and lever and engaging at its lower end about said flange, a second lever associated with each of said first named levers and engaging about said socket, means rockably mounting said second lever on the upper side of said frame, a pair of links pivotally connected between each of said first named lever and said second lever, and a wheel spindle carried by one of said links.

JOSEPH KONOPKA.
EDWARD J. KONOPKA.

REFERENCES CITED

The following references are of record in the file of this patent:

UNITED STATES PATENTS

| Number | Name | Date |
|---|---|---|
| 2,090,141 | Newton | Aug. 17, 1937 |
| 2,190,298 | Slack | Feb. 13, 1940 |
| 2,208,538 | Brown | July 16, 1940 |
| 2,254,282 | Griswold | Sept. 2, 1941 |
| 2,255,370 | Tydelski | Sept. 9, 1941 |
| 2,297,591 | Urich | Sept. 29, 1942 |
| 2,321,832 | Leighton | June 15, 1943 |